Dec. 8, 1970   C. LOYD   3,546,553
SYSTEM FOR MAINTAINING A MOTOR AT A PREDETERMINED SPEED
UTILIZING DIGITAL FEEDBACK MEANS
Filed Sept. 6, 1968

INVENTOR
CLAYTON LOYD

BY

ATTORNEYS

United States Patent Office 3,546,553
Patented Dec. 8, 1970

1

3,546,553
SYSTEM FOR MAINTAINING A MOTOR AT A PREDETERMINED SPEED UTILIZING DIGITAL FEEDBACK MEANS
Clayton Loyd, Huntsville, Ala., assignor to the United States of America as represented by the Administrator of the National Aeronautics and Space Administration
Filed Sept. 6, 1968, Ser. No. 757,875
Int. Cl. H02p 5/06
U.S. Cl. 318—318                                     3 Claims

ABSTRACT OF THE DISCLOSURE

This disclosure is a control system for maintaining a motor constant at a prescribed speed and involves a feedback generator for providing digital pulses at a frequency dependent on the speed of the motor and a variable speed control oscillator for providing control signal pulses having a frequency in accordance with a predetermined desired speed of the motor. A countdown and referencing circuit is provided for counting down the control pulses to the desired frequency and is designed to be reset to zero on the occurrence of each feedback pulse so as to only produce an output pulse when the frequency of the feedback pulses is lower than the desired frequency. The outputs of the feedback generator and countdown and referencing circuit are fed to a detector circuit. The detector is arranged to produce a first output voltage level signal on the occurrence of a pulse from the countdown and referencing circuit and a second output voltage level signal if two pulses arrive from the feedback generator before another pulse arrives from the countdown and referencing circuit. The detector is designed to drive an output motor control which supplies power to the motor in accordance with the output voltage level of the detector circuit to return the motor to the prescribed speed.

---

The invention described herein was made by an employee of the United States Government and may be manufactured and used by or for the Government for governmental purposes without the payment of any royalties thereon or therefor.

BACKGROUND OF THE INVENTION

This invention relates to a system for maintaining a motor at a predetermined speed. More particularly, the invention relates to such a system wherein the deviation of the actual speed from the predetermined speed of the motor is corrected utilizing digital pulses.

In conventional systems for controlling the speed of a motor, a tachometer-generator is usually coupled to a rotating motor shaft. The tachometer generates an A.C. signal which is a function of the actual motor speed.

In one type of conventional system, the tachometer signal is rectified to produce a D.C. voltage which is compared with a reference voltage in a conventional voltage comparator circuit. In such a system, a single D.C. volt may represent hundreds or even thousands of motor shaft revolutions. In the present state of the art of tachometer-generator design, a tachometer-generator cannot linearly generate a minute fraction of a volt to represent a single shaft revolution. Thus, the accuracy of this type of conventional system is limited at the outset by the inability of tachometer-generators to linearly represent the actual motor speed.

In another type of conventional system, the tachometer signal is applied to an RC network which produces a pulsating voltage representative of the motor speed. The pulsating voltage is applied to a winding of a servomotor which controls a potentiometer in a conventional voltage comparator circuit.

2

The voltage comparator circuit employed in both of these conventional systems usually comprises a vacuum tube regulator. The difference between the voltage representing the actual motor speed and the reference voltage is applied to a conventional motor control unit to adjust the speed of the motor. Since vacuum tubes are somewhat unstable devices and are adversely affected by transient voltages and aging effects, other limiting factors may be introduced into the accuracy of conventional motor control systems.

Accordingly, an objective of the present invention is to provide a new and improved system for maintaining a motor at a predetermined speed.

Another object is to provide a new and improved system for maintaining a motor at a predetermined speed wherein the deviation of actual speed from predetermined speed of the motor is corrected utilizing digital pulses.

Still another object of this invention is to provide a system for maintaining a motor at a predetermined speed wherein the actual speed of the motor and the prescribed speed of the motor are represented by respective pluralities of digital pulses, the respective pluralities of digital pulses energizing facilities to correct the deviation.

SUMMARY OF THE INVENTION

With these and other objects in view, a system for maintaining a motor at a predetermined speed, illustrating certain features of the invention, includes a feedback generator which senses the speed of the motor and which generates digital feedback pulses, the frequency of which indicate the actual speed of the motor. The frequency of the feedback pulses is compared with the desired frequency by the novel technique of providing a resettable countdown and referencing circuit which produces an output pulse when the time period between two consecutive feedback pulse is greater than a time representative of the prescribed speed of the motor. This technique coupled with the unique use of a detector circuit responsive to the output pulses of the countdown and referencing circuit and to the feedback pulses allows the generation of a corrective pulse indicative of the direction of deviation of the actual speed from the prescribed speed of the motor.

DESCRIPTION OF THE DRAWINGS

Other objects and advantages of the invention will become apparent by reference to the following detailed specification and accompanying drawings wherein.

DESCRIPTION OF THE PREFERRED EMBODIMENT

Figure 1:
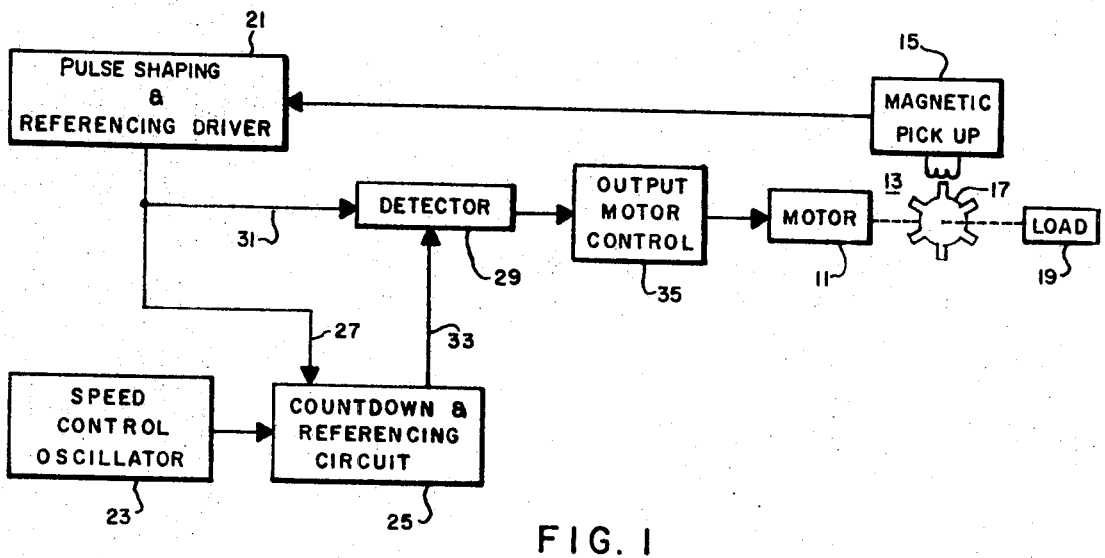
FIG. 1 is a block diagram of a system for maintaining a motor at a predetermined speed in accordance with the present invention.

With reference to FIG. 1, there is shown a motor 11 which is to be maintained at a predetermined speed. A feedback generator, generally indicated at 13, is provided for obtaining a signal in the form of a plurality of feedback pulses having a frequency which varies in accordance with the speed of the motor and may comprise any number of well known devices. In the now preferred embodiment of the invention the feedback generator 13 comprises a magnetic or the like pickup device 15 operative to sense the speed of the motor through a driven tooth member 17 or the like. The driven tooth member may be driven directly by the shaft of the motor or alternately may be driven by the load 19 so that its rotation will be independent of any slippage between the motor and the load. A pulse shaping and referencing driver 21 is connected to receive the succession of feedback pulses from the magnetic pickup 15 and to shape if necessary and to produce sufficient power for the subsequent precise comparison of these pulses. The pulse shaping and referencing driver 21 may be constituted for example by a driver circuit as described in FIG. 36.5, page 467 in "Transistor Circuit Design," McGraw Hill Book Company, Inc., 1963, edited by Joseph A. Walston and John R. Miller.

The control apparatus also includes a speed control oscillator 23 for providing a plurality of control pulses and preferably consists of any known variable frequency oscillator having an accuracy slightly greater than that required for the motor being controlled. A countdown and referencing circuit 25 is connected to receive the control pulses from the oscillator 23. The countdown and referencing circuit may consist of any well known resettable countdown device and is operative to divide the frequency of the control pulses to the desired rate by counting the control pulses and producing an output pulse when the desired number of control pulses have occurred and have been counted. The countdown and referencing circuit is also responsive to the feedback pulses from the pulse shaping and referencing driver 21 via lead 27, to reset the countdown and referencing circuit to zero on the occurrence of each feedback pulse, with the result that no output pulse will be forthcoming from the countdown and referencing circuit 25 unless the predetermined number of control pulses occur and are counted between the occurrence of two consecutive feedback pulses. The countdown and referencing circuit may be constituted for example by a circuit as described in FIG. 8018 in "Instruction Manual for High Speed Data Acquisition System 4125," Astrodata Corporation, 1967.

Figure 2:
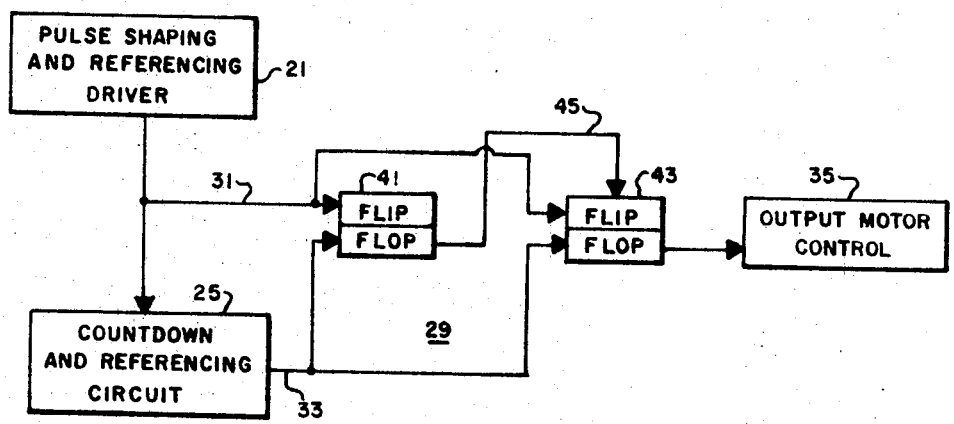
FIG. 2 is a block diagram illustrating the different units of the reference detector of FIG. 1.

A detector 29 has its first input supplied with feedback pulses from the pulse shaping and referencing driver 21 via lead 31. The detector has a second input supplied with output pulses from the countdown and referencing circuit via lead 33. The detector, details of which are shown in FIG. 2, includes circuits responsive to the feedback pulses from the pulse shaping and referencing driver 21 and to the output pulses of the countdown and referencing circuit 25 to produce a correction pulse indicative of the direction of deviation of the actual speed from the prescribed speed of the motor. In particular, the detector is operative to produce a first level output voltage on the occurrence of an output pulse from the countdown and referencing circuit and is operative to produce a second level output voltage level if two consecutive feedback pulses occur before a second output pulse from the countdown and referencing circuit occurs. Output motor control 35 is responsive to the correction signal of the detector 29, to increase or decrease the speed of the motor toward the prescribed speed. Output motor control may be any number of conventional speed control devices for performing the actual mechanics of adjusting the speed of the motor. In this regard the output motor control 35 may be constituted for example by an automatic drive control circuit as described in FIG. 37.4, page 478 in "Transistor Circuit Design," McGraw-Hill Book Company, Inc., 1963, edited by Joseph A. Walston and John R. Miller.

In FIG. 2 there is shown a schematic circuit arrangement of one form of the detector 29 such that a first flip-flop device 41 and second flip-flop 43 device are supplied with the feedback pulses from the pulse shaping and referencing driver 21 and with the output pulses from the countdown and referencing circuit 25. The output of the first flip-flop device 41 is supplied to the inhibit gate of the second flip-flop device by lead 45 and the output of the second flip-flop device 43 is supplied to the input of the output motor control circuit. A flip-flop circuit is a bistable multivibrator characterized in that it has two stable states of operation; that is, the flip-flop circuit remains in one state of operation until triggered into its second state of operation by an external pulse.

In the operation of the detector, flip-flop circuit 41 is triggered to its first or "1" state of condition and flip-flop 43 is triggered to its first or "1" state by an output pulse from the countdown and referencing circuit 25. On the occurrence of a feedback pulse from the pulse shaping and referencing driver 21, flip-flop circuit 41 will be triggered to its second or "0" state however, flip-flop circuit 43 will remain in the first of "1" state since the output of the flip-flop circuit 41 is connected to the inhibit gate of the flip-flop circuit 43. On the occurrence of the second feedback pulse from the pulse shaping and referencing driver, flip-flop circuit 41 will remain in the second or "0" state however, flip-flop circuit 43 will now be triggered to its second or "0" state since the output of the flip-flop circuit 41 applied to the inhibit gate of the flip-flop circuit 43 will no longer inhibit its change of condition. Thus, the flip-flop circuit 43 will remain in its first or "1" state unless two feedback pulses are forthcoming from the pulse shaping and referencing driver 21 before an output pulse is forthcoming from the countdown and referencing circuit 25.

In the operation of the control apparatus as shown in FIG. 1, the speed control oscillator 23 provides a plurality of control pulses whose repetition rate is adjusted as desired for providing the desired speed of the motor 11. The control pulses from the speed control oscillator are supplied to the input of the countdown and referencing circuit 25. The countdown and referencing circuit 25 is operative to produce an output pulse after a predetermined number of control pulses have occurred and are counted. The output pulse produced by the countdown and referencing circuit is supplied to one input of the detector 29 via lead 33 and causes the detector to assume a first or "1" state. The output motor control 35 is operative to sense the state of the detector 29 and to provide or at least control the operating power for the motor 11 so as to start the motor turning. This turning activates the magnetic pickup device 15 by means of the toothed wheel member 17 which generates feedback pulses whose frequency is proportional to the actual operating speed of the motor.

The pulse shaping and referencing driver 21 then amplifies and shapes each feedback pulse. These pulses are applied to the second input of the detector 29 via lead 31 and to the reset input of the countdown and referencing circuit 25 via lead 27. Each feedback pulse that is applied to the reset input of the countdown and referencing circuit 25 resets the countdown and referencing circuit to zero. The countdown and referencing circuit 25 thus commences its countdown operation on the occurrence of each feedback, thereby providing a time reference to measure the frequency of the feedback pulses. When the speed of the motor 11 is less than the prescribed speed, the time interval between consecutive feedback pulses will be longer than the time necessary for the countdown and referencing circuit 25 to count the predetermined number of control pulses from the speed control oscillator and an output pulse will be produced by the countdown and referencing circuit and applied to the detector 29 to maintain in its first or "1" state.

As the speed of the motor 11 increases, a point will be reached where the time interval between consecutive feedback pulses is less than the time needed for the countdown and referencing circuit 25 to produce an output pulse. Under this condition the countdown and referencing circuit 25 will be reset to zero by a first feedback pulse and before the predetermined number of control pulses from the speed control oscillator have occurred, a second feedback pulse will be forthcoming from the pulse shaping and referencing driver which will reset the countdown and referencing circuit to zero without the production of an output pulse. These first and second feedback pulses will also be applied to the detector 29 and will cause the detector to assume a second or "0" state. The output motor control 35 is operative to sense the change in the state of the detector 29 and acts to lower the speed of the motor 11.

Thus, the output of the detector 29 indicates whether the speed of the motor 11 is faster or slower than the prescribed speed set by the speed control oscillator without the use of an analog comparison between a voltage representing the actual motor speed and a voltage representing the desired speed.

It is to be understood that the above identified embodiment of the system for maintaining a motor at a predetermined speed is merely illustrative of the principles of the invention, and other embodiments may be devised without departing from the scope of the invention.

What is claimed is:

1. A system for maintaining a motor at a predetermined speed comprising:
   feedback means for sensing the actual speed of the motor and for generating feedback pulses having a frequency representative of said actual speed;
   pulse generator means responsive to said feedback pulses for producing an output pulse when the time interval between successive feedback pulses is greater than a time representative of a prescribed speed;
   a bistable trigger circuit coupled to receive said feedback pulses and said output pulses, said bistable trigger circuit being triggerable to a first stable state on the occurrence of each output pulse and being triggerable to a second stable state on the occurrence of two consecutive feedback pulses;
   motor control means responsive to the output of said trigger circuit for returning the motor to the prescribed speed.

2. The system for maintaining a motor at a predetermined speed according to claim 1 wherein said bistable trigger circuit includes:
   a first flip-flop circuit coupled to receive said output pulses and said feedback pulses, said first flip-flop circuit being triggerable to a first stable state by the occurrence of an output pulse and being triggerable to a second stable state by the occurrence of a feedback pulse; and
   a second flip-flop circuit coupled to receive said output pulses and said feedback pulses and having an inhibit gate coupled to the output of said first flip-flop circuit, said second flip-flop circuit being triggerable to a first stable state by the occurrence of an output pulse and being triggerable to a second stable state by the occurrence of two consecutive feedback pulses.

3. The system for maintaining a motor at a predetermined speed according to claim 1 wherein the pulse generator means includes:
   a control signal source for providing control signal pulses having a predetermined frequency; and
   a resettable countdown circuit for producing said output pulse after a predetermined number of control pulses have been counted, said countdown circuit having a first input connected to receive said control signal pulses for increasing the count of said countdown circuit and having a second input connected to receive said feedback pulses for resetting said countdown circuit to zero on the occurrence of each feedback pulse.

References Cited
UNITED STATES PATENTS 3,331,006  7/1967  Strand et al. _____ 318—318X ORIS L. RADER, Primary Examiner H. HUBERFELD, Assistant Examiner U.S. Cl. X.R.
318—341